(12) United States Patent
Haberbusch et al.

(10) Patent No.: US 7,434,407 B2
(45) Date of Patent: Oct. 14, 2008

(54) NO-VENT LIQUID HYDROGEN STORAGE AND DELIVERY SYSTEM

(75) Inventors: Mark S. Haberbusch, Amherst, OH (US); James Parkes, Hinkley, OH (US); Adam John Culler, Milan, OH (US)

(73) Assignee: Sierra Lobo, Inc., Fremont, OH (US)

( * ) Notice: Subject to any disclaimer, the term of this patent is extended or adjusted under 35 U.S.C. 154(b) by 391 days.

(21) Appl. No.: 10/820,654

(22) Filed: Apr. 8, 2004

(65) Prior Publication Data

US 2005/0132745 A1  Jun. 23, 2005

Related U.S. Application Data

(60) Provisional application No. 60/461,639, filed on Apr. 9, 2003.

(51) Int. Cl.
*F25B 9/00* (2006.01)

(52) U.S. Cl. .......................................................... 62/6

(58) Field of Classification Search .................. 62/6, 62/45.1, 47.1, 51.1
See application file for complete search history.

(56) References Cited

U.S. PATENT DOCUMENTS

| | | | | |
|---|---|---|---|---|
| 2,937,076 A | * | 5/1960 | Class et al. ................. 423/649 |
| 3,007,596 A | * | 11/1961 | Matsch .................. 220/560.13 |
| 3,262,279 A | * | 7/1966 | Moore, Jr. ..................... 62/55.5 |
| 3,358,463 A | * | 12/1967 | Hawkins et al. .............. 62/51.1 |
| 3,930,375 A | * | 1/1976 | Hofmann .................... 62/45.1 |
| 4,292,062 A | * | 9/1981 | Dinulescu et al. ................ 62/7 |
| 4,362,403 A | * | 12/1982 | Mooney .......................... 374/4 |
| 4,608,830 A | * | 9/1986 | Peschka et al. ................... 62/7 |
| 4,672,842 A | * | 6/1987 | Hasselmann ................ 73/49.2 |
| 4,915,507 A | * | 4/1990 | Janotta ....................... 374/115 |
| 5,107,683 A | * | 4/1992 | Chan et al. ........................ 62/6 |

(Continued)

OTHER PUBLICATIONS

Garnier, D., Status of the LDX Project, talk presented at the Innovative Confinement Concepts☐☐Workshop 2000, Berkeley, California, Feb. 24, 2000.*

(Continued)

*Primary Examiner*—Cheryl J. Tyler
(74) *Attorney, Agent, or Firm*—Pearne & Gordon LLP (57) ABSTRACT

A hydrogen storage and delivery system is provided having an orifice pulse tube refrigerator and a liquid hydrogen storage vessel. A cooling system, coupled to the orifice pulse tube refrigerator, cools the vessel and abates ambient heat transfer thereto in order to maintain the liquid hydrogen in the vessel at or below its saturation temperature. Hydrogen boil-off, and the necessity to provide continuous venting of vaporized hydrogen are minimized or avoided. In a preferred embodiment, the hydrogen storage vessel has a toroidal shape, and the pulse tube refrigerator is a two stage pulse tube refrigerator and extends within a central void space defined at the geometric center of the toroidal storage vessel. Also in a preferred embodiment, the cooling system includes first and second thermal jackets, each having a substantially toroidal shape and enclosing the storage vessel, wherein each of the thermal jackets is thermally coupled to one of the first or second stages of the pulse tube refrigerator in order to cool the vessel and to abate ambient heat leak thereto. The hydrogen storage and delivery system is particularly suitable for use in vehicles, such as passenger automobiles.

53 Claims, 3 Drawing Sheets

U.S. PATENT DOCUMENTS

| | | | | |
|---|---|---|---|---|
| 5,286,345 | A | * | 2/1994 | Burt ............................ 216/48 |
| 5,642,623 | A | * | 7/1997 | Hiresaki et al. ................... 62/6 |
| 5,966,944 | A | * | 10/1999 | Inoue et al. ................... 62/51.1 |
| 6,192,690 | B1 | * | 2/2001 | Stautner .......................... 62/6 |
| 6,332,324 | B1 | * | 12/2001 | Saho et al. ................... 62/51.1 |
| 6,430,938 | B1 | | 8/2002 | Royal et al. |
| 6,431,750 | B1 | * | 8/2002 | Haberbusch et al. ........ 374/166 |
| 6,438,969 | B1 | * | 8/2002 | Laskaris et al. .............. 62/51.1 |
| 6,640,552 | B1 | * | 11/2003 | Rampersad et al. .............. 62/6 |

OTHER PUBLICATIONS

C. Wang, G. Thummes, C. Heiden, "Expimental study of staging method for two-stage pulse tube refrigerators for liquid 4He temperatues", Cryogenics, 1997, vol. 37, issue 12, pp. 857-863.*

W.G. Foster, J. Olson, P. Champagne, B. Evtimov, E. Will, A. Collaco, T. Nast, R. Clappier, A. Mitchell, D. Jungkman, R. Radebaugh, and D.G.T Curran, "Development of a High Capacity Two-Stage Pulse Tube Cryocooler", Cryocoolers 12, Kluwer Academic/Plenum Publishers, 2003.*

C. Wang, "Numerical analysis of 4 K pulse tube coolers: Part I. Numerical simulation", Cryogenics, 1997, vol. 37, issue 4, pp. 207-213.*

C. Wang, "Numerical Analysis of 4 K pulse tube coolers: Part II. Performances and internal processes" Cryogenics, 1997, vol. 37, issue 4, pp. 215-220.*

A. Zhukovsky, M. Morgan, D. Garnier, A. Radovinsky, B. Smith, J. Schultz, L. Myatt, S.Pourrahimi, J. Minervini, "Design and Fabrication of the Cryostat for the Floating Coil of the Levitated Dipole Experiment (LDX)", IEEE Transactions on applied superconductivity, vol. 10, No. 1, Mar. 2000.*

D. W. Boys, S. Legvold, "Thermal Conductivities and Lorenz Functions of Dy, Er, and Lu Single Crystals", Physical Review, Oct. 10, 1968, vol. 174, No. 2, pp. 377-384.*

Case Study: Toroidal Pressure, 2 pages, available on www.qinetiq.com at least as early as Apr. 14, 2003.

Pioneer Rocketplane Reusable Launch System, 6 pages, available on www.spacecoretech.org at least as early as Dec. 25, 2002.

"2.0 Vehicle Description", pp. 2-1 through 2-14, at least as early as Oct. 2002.

Andrew H. Weisberg et al., "Hydrogen Storage Using Lightweight Tanks", Proceedings of the 2002 U.S. Doe Hydrogen Program Review, pp. 1-19.

P.J. Mueller et al., "Hydrogen Storage System for a Mars Sample Return Mission: Analysis of a Non-Venting Approach", 32nd AIAA/ASME/SAE/ASEE Joint Propulsion Conference, Jul. 1-3, 1996, pp. 1-10.

L.J. Salerno et al., "Terrestrial Applications of Zero-Boil-Off Cryogen Storage", *Commercial Cryocooler Applications*, Kluwer Academic/Plenum Publishers, 2001, pp. 809-816.

David Plachta et al., "An Updated Zero Boil-Off Cryogenic Propellant Storage Analysis Applied to Upper Stages or Depots in an LEO Environment", NASA/TM-2003-211691, Jun. 2003, 13 pages.

R. Ewald et al., "Cryogenic Equipment of Liquid Hydrogen Powered Automobiles", *Advances in Cryogenic Engineering*, vol. 35, R. Ewald et al., Plenum Press, New York, 1990, pp. 1777-1781.

Gene D. Berry et al., "Hydrogen Storage and Transportation", U.S. Department of Energy, Doc. No. UCRL-JC-149882, Jul. 24, 2003, 38 pages.

Douglas G. Thorpe, "Space Shuttle With Common Fuel Tank for Liquid Rocker Booster and Main Engines (Supertanker Space Shuttle)", presented to The Space Transportation Propulsion Technology Symposium, Jun. 25-29, 1990; pp. 1135-1185.

* cited by examiner

NO-VENT LIQUID HYDROGEN STORAGE AND DELIVERY SYSTEM

This application claims the benefit of U.S. Provisional Patent Application Ser. No. 60/461,639 filed Apr. 9, 2003, the contents of which are incorporated herein by reference.

BACKGROUND OF THE INVENTION

1. Field of the Invention

The present invention relates to a system for storing and dispensing liquid hydrogen without venting, and more particularly to such a storage and delivery system for use in an automobile, light or heavy duty trucks, boats, or transportation systems or vehicles in general that use hydrogen for fuel, such that a vehicle can store a large quantity of hydrogen fuel in the liquid state without requiring hydrogen venting due to boil-off.

2. Description of Related Art

Recently, and especially in view of the global oil climate, the automotive industry has reported serious development efforts to produce hydrogen powered vehicles. A key benefit to using hydrogen as opposed to conventional fossil fuels is that hydrogen burns cleanly, producing only water as a combustion product, it yields no carbon monoxide or carbon dioxide emissions, and it dramatically reduces $NO_x$ emissions. When used with fuel cells, hydrogen reacts with oxygen and produces only water. Furthermore, hydrogen fuel is abundantly available in limitless supply, whereas existing fossil fuel reserves are finite, and eventually will run out. For these reasons, hydrogen would seem to be an ideal fuel for modern automobiles. However, widespread use of hydrogen as automobile fuel has been prevented due to several major concerns.

In particular, storing and handling liquid hydrogen is difficult and can be dangerous. Hydrogen is highly combustible and is prone to explode when combined with atmospheric oxygen in the presence of an ignition source. In addition, hydrogen has a very high vapor pressure, boiling at about 20K under atmospheric pressure. Therefore, conventionally hydrogen is stored either in its gaseous state in high pressure tanks (about or even greater than 5000 psia gaseous hydrogen), or in low pressure liquid storage vessels which must be vented to relieve hydrogen overpressure as a result of vaporization due to ambient heat leak into the storage vessels (e.g. typical ambient temperature of about 298K or 25° C.).

Neither of these hydrogen storage mechanisms is suitable for use in privately owned and operated automobiles. First, at 5000 psia, conventional size high-pressure storage tanks can hold only a relatively small amount of hydrogen, i.e. about 2-4 kg. The size of these tanks is further limited due to space and weight constraints in an automobile. The limited storage volume for hydrogen fuel means limited automobile driving range between refuelings. Another perhaps more significant disadvantage is that storing a highly explosive fuel, such as gaseous hydrogen, at high pressure on the order of 5000 psia in an automobile presents a significant danger to both occupants and bystanders should the pressure tank or associated high pressure hardware fail.

Second, conventional low pressure liquid hydrogen storage vessels are unsuitable for storing hydrogen fuel in automobiles due to the requirement of venting vaporized hydrogen gas to the atmosphere. Hydrogen overpressure results from heat transfer from the environment into the storage vessel causing liquid hydrogen to boil and vaporize. The hydrogen vapor continues to expand as ambient heat energy is further absorbed, and the storage tanks must be vented of this hydrogen vapor to prevent explosion of the vessel due to hydrogen overpressure. Therefore, today's typical liquid hydrogen storage systems involve or require controlled venting of boil-off hydrogen gas whose release into the atmosphere must be directed and controlled to prevent concentrated pockets hydrogen gas in confined spaces (e.g. inside buildings) where it may explode or cause a fire. For these reasons, existing hydrogen vents typically are located in remote areas or at safe distances above the tallest structure in the vicinity of the vent. If the quantity of vented hydrogen is sufficiently large then burn-off stacks usually must be utilized.

It is easy to understand why it will be impractical for every parking space, garage, and driveway to be equipped with a hydrogen vent stack for venting hydrogen overpressure while a hydrogen-powered vehicle is parked. In fact, even if it were possible to provide such stationary hydrogen vent stacks, automobiles are by definition "mobile," and it is totally impractical to limit people to stationing their cars only in locations where there is an available hydrogen vent stack. In addition, the near continuous venting of hydrogen gas is a significant waste of fuel that greatly diminishes the efficiency of a hydrogen-powered automobile.

Several automotive manufacturers have conducted experiments involving vehicles that operate using hydrogen in both liquid and gaseous forms, however no one has yet devised a mechanism for storing highly dense liquid hydrogen (compared to gaseous hydrogen) in a hydrogen-powered automobile which does not require venting to relieve hydrogen overpressure.

Another technology that has been proposed to store large quantities of hydrogen is surface-adsorption onto a metal-hydride matrix. It has been reported that hydrogen densities (mass hydrogen per storage volume) comparable to liquid hydrogen can be obtained via this technique of adsorbing onto the surface of metal hydride matrices, however the inventors have not been able to verify this. Regardless, there are still several disadvantages to the use of metal hydrides for storing gaseous hydrogen. First, storing hydrogen in this manner requires ultra high purity hydrogen gas; even very small amounts of common contaminants such as carbon monoxide would significantly decrease the metal hydride adsorptive storage capacity for hydrogen. Second, to date only very small metal hydride containers (e.g. for use in portable electronic devices) have been developed, and it is not clear that extrapolating this concept to the scale required to store a reasonable quantity of hydrogen fuel for an automobile would be straight-forward or even possible. Third, the exotic metals required to produce metal hydride matrices for hydrogen storage would be cost prohibitive on the scale required to provide adequate hydrogen storage capacity for an automobile. Fourth, metal hydride hydrogen adsorption systems are very heavy, and may contribute significantly to the weight of an automobile.

Accordingly, there is a need in the art for a system for storing hydrogen fuel in liquid form in a hydrogen-powered automobile or in an automobile equipped with a hydrogen powered fuel cell, that does not need to be vented to relieve hydrogen overpressure.

SUMMARY OF THE INVENTION

A hydrogen storage and delivery system is provided, having a liquid hydrogen storage vessel, a substantially vertically oriented orifice pulse tube refrigerator, and a cooling system coupled to the orifice pulse tube refrigerator. The cooling system is adapted to counteract or abate heat transfer to the storage vessel from the ambient environment.

An automobile having a hydrogen-powered internal combustion engine and/or a hydrogen powered fuel cell, and a hydrogen storage and delivery system also is provided, wherein the system includes a liquid hydrogen storage vessel, an orifice pulse tube refrigerator, and a cooling system coupled to the orifice pulse tube refrigerator. The cooling system is adapted to counteract or abate heat transfer to the storage vessel from the ambient environment.

A hydrogen storage and delivery system also is provided having a toroidal liquid hydrogen storage vessel, an orifice pulse tube refrigerator, and a cooling system. The toroidal storage vessel has an interior surface defining a liquid hydrogen storage volume, and the storage vessel further defines a void space located at the geometric center of the storage vessel. The orifice pulse tube refrigerator extends within the void space at the geometric center of the storage vessel. The orifice pulse tube refrigerator includes a first stage pulse tube refrigeration unit and a second stage pulse tube refrigeration unit, each of the first and second stage refrigeration units having a respective regenerator, cold heat exchanger, pulse tube and hot heat exchanger, wherein net refrigeration power for each of the first and second stage refrigeration units is generated at the respective first and second stage cold heat exchangers. The cooling system includes a first thermal jacket in the shape of a toroid located concentrically adjacent and substantially enclosing the liquid hydrogen storage vessel, and a second thermal jacket in the shape of a toroid located concentrically adjacent and substantially enclosing the first thermal jacket.

DETAILED DESCRIPTION OF THE PREFERRED EMBODIMENTS OF THE INVENTION

As used herein, when a range such as 5 to 25 (or 5-25) is given, this means preferably at least 5, and separately independently, preferably not more than 25. Unless otherwise specified, all components described herein are made from conventional materials in a conventional manner.

A liquid hydrogen storage and delivery system 10 is provided that is cooled via an orifice pulse tube refrigerator. In its broadest aspect, the invention includes a liquid hydrogen storage vessel 20, an orifice pulse tube refrigerator (OPTR) 30, and a cooling system 40 coupled to the OPTR 30 and adapted to cool the storage vessel 20, or to shield it from ambient thermal energy. In the preferred embodiment, the OPTR 30 has two cooling or refrigeration stages as more fully described below. The storage and delivery system 10 is suitable to be provided or incorporated into an automobile equipped with a hydrogen powered internal combustion engine, and/or a hydrogen powered fuel cell, to store liquid hydrogen without the need for venting. As used herein, an automobile can be any ground transportation vehicle, including but not limited to cars, trucks, trains, etc. It is also believed the system could be adapted to store liquid hydrogen in aircraft and watercraft. A vehicle, as used herein, includes automobiles, aircraft and watercraft.

Figure 1:
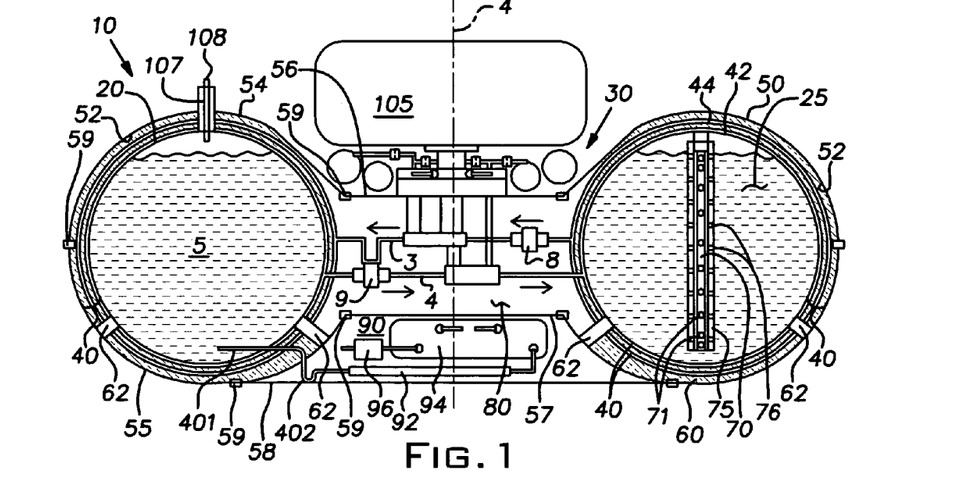
FIG. 1 is a schematic view, partially in cross-section, of a liquid hydrogen storage and delivery system according to a preferred embodiment of the invention, including a toroidal hydrogen storage vessel and a two-stage orifice pulse tube refrigeration unit.
Figure 2:
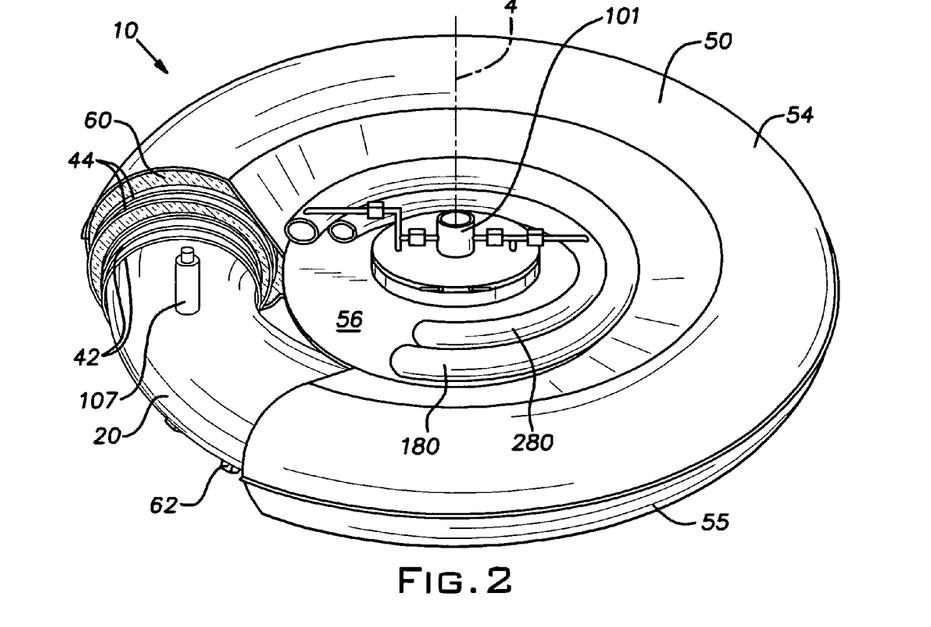
FIG. 2 is a top isometric view, partially broken away, of the liquid hydrogen storage and delivery system of FIG. 1.
Figure 3:
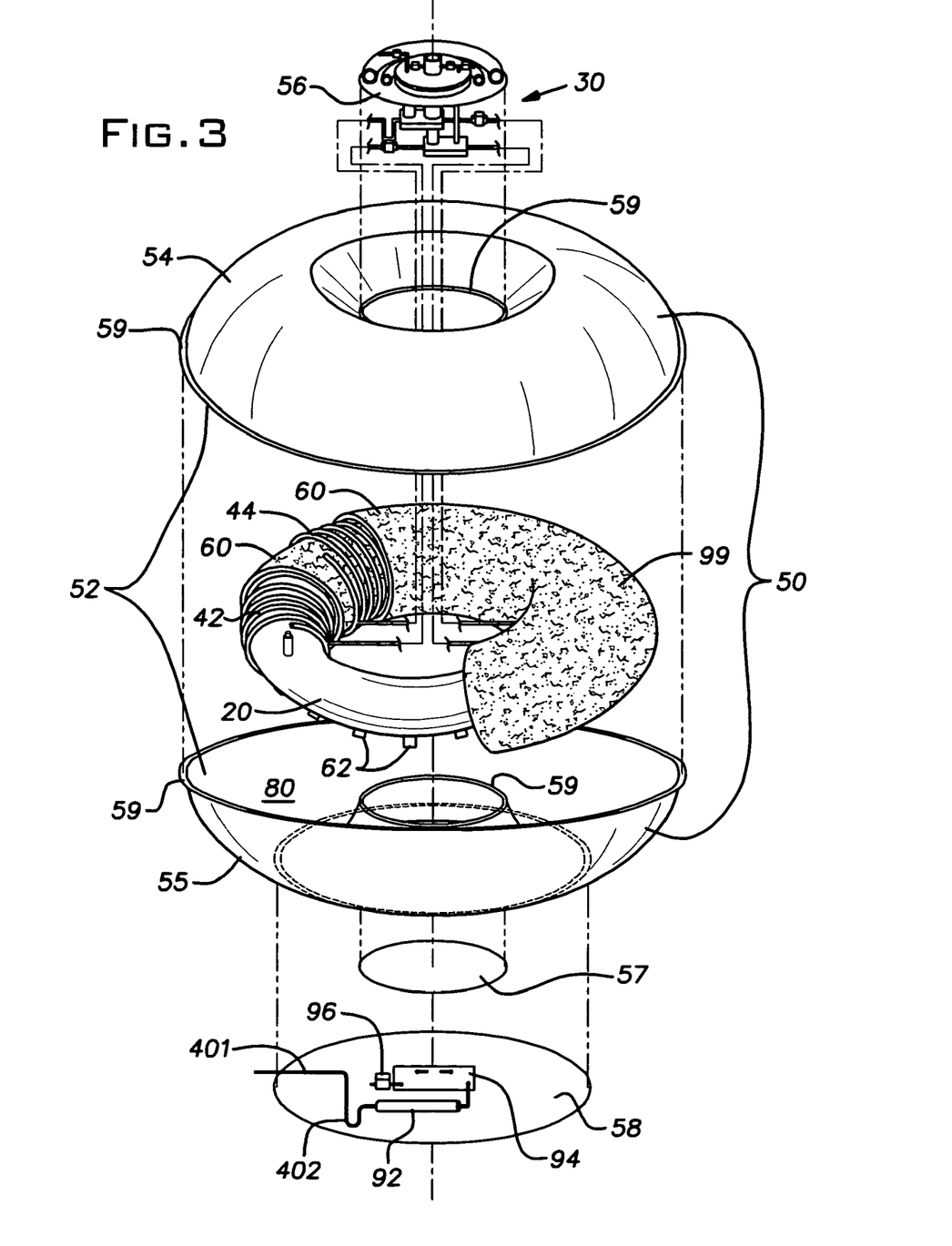
FIG. 3 is a centerline exploded view of the liquid hydrogen storage and delivery system of FIG. 1.

Referring to FIGS. 1-3, a preferred embodiment of the invention is shown. In this embodiment, the hydrogen storage vessel 20 is provided generally in the shape of a hollow toroid, whose interior surface defines a hydrogen storage volume 25. The toroidal hydrogen storage vessel 20 is substantially enclosed by first and second thermal jackets 42 and 44 respectively. The thermal jackets 42 and 44 are positioned concentrically with respect to the hydrogen storage vessel 20, with the first thermal jacket 42 provided adjacent, preferably substantially in contact with the outer surface of the vessel 20, and the second thermal jacket 44 provided adjacent and substantially enclosing the first thermal jacket 42. In the illustrated embodiment, the first thermal jacket is provided as a length of copper tubing wound around the storage vessel 20, substantially around the entire circumference thereof. As will be evident from the figures, the copper tubing of the first thermal jacket 42 is wound or coiled into an overall substantially toroidal shape around and enclosing the toroidal vessel 20. Preferably, the copper tubing of the first thermal jacket 42 is brazed or soldered to the outer surface of the vessel 20 in order to promote efficient conductive heat transfer from the vessel wall to the refrigerant fluid that circulates through the tubing. To facilitate intimate surface-to-surface contact between the tubing of the jacket 42 and the surface of the vessel 20, the tubing can be provided having at least one flat side extending longitudinally along its outer surface; i.e. as D-shaped tubing having a D-shaped cross section, with the flat side provided (brazed) against the vessel 20 surface.

A layer of super insulation 60 preferably is disposed over the first thermal jacket 42, substantially enclosing it and the vessel 20. The second thermal jacket 44 preferably also is provided as a length of copper tubing, also wound or coiled so as to define an overall substantially toroidal shape around and enclosing the first thermal jacket 42, the vessel 20 and a portion of the super insulation 60. Preferably, the second thermal jacket 44 is spaced a distance from the first thermal jacket 42, and is provided or embedded within the super insulation 60. Preferably, the super insulation 60 comprises double-aluminized Mylar film layers with Dacron netting spacers between the Mylar layers as known in the art. (Mylar and Dacron are registered trademarks of DuPont). Preferably, the super insulation 60 has a Mylar layer density of 52 layers per inch or about 52 layers per inch. When the super insulation 60 is provided as multiple layers of super insulation material, the second thermal jacket 44 tubing can be provided between adjacent layers of the insulation material.

Cooling of the liquid storage vessel 20, and effective shielding of the vessel 20 from ambient heat leak are achieved by circulating a refrigerated fluid or refrigerant through the copper tubing of the first thermal jacket 42. In addition, the magnitude of ambient heat transfer to the first thermal jacket 42 is minimized by circulating a refrigerant through the copper tubing of the second thermal jacket 44, thereby lowering the required cooling duty of the first thermal jacket 42 to counteract thermal energy transfer to the vessel 20. The mechanisms for circulating and refrigerating the refrigerants are described more fully below. It should be noted here, however, that each of the thermal jackets has circulated therethrough a separate refrigerant, and each jacket is maintained at a different temperature, with the first (innermost) jacket 42 being maintained at a lower temperature (described in detail below). The refrigerants circulated through the first and second thermal jackets 42 and 44 can be the same fluid material (i.e. they can both be helium), but they are separately circulated and separately refrigerated from one another.

In an alternate embodiment, each of the first and second thermal jackets 42 and 44 can have an inner wall and an outer wall (relative to the cross-sectional diameter of the respective jacket), defining a generally annular toroidal jacketing volume for each thermal jacket. In this alternative embodiment, cooling of the liquid storage vessel 20 is achieved by circulating a refrigerated fluid or refrigerant through the jacketing volumes of each of the thermal jackets 42 and 44. This embodiment generally is less preferred due to the potential for nonuniform circulation of the refrigerants through the annular toroidal jacketing volumes.

In a further alternative embodiment, the first and second thermal jackets 42 and 44 can be provided having only a single wall, such that the first jacketing volume is defined between the first jacket 42 and the outer surface of the vessel 20, and the second jacketing volume is defined between the second jacket 44 and the first jacket 42. This embodiment also is less preferred because of the potential for nonuniform circulation of the refrigerants through annular toroidal jacketing volumes.

Most preferably, the liquid storage vessel 20 is provided having a unitary construction, and is not assembled from respective halves via flanges or mechanical fasteners. However, it is permissible to manufacture the vessel 20 in halves, and then to weld the halves together, e.g., at inner and outer circumferential weld seams, so as to provide an integrally formed finished vessel 20 of unitary construction. Preferably, the vessel 20 is made from stainless steel, less preferably from aluminum, carbon composite or other composite materials, less preferably any other material suitable for storing cryogenic fluids, particularly cryogenic liquid hydrogen at or below 20K, and capable of withstanding an internal pressure of at least 40, preferably 50, preferably 60, preferably 80, preferably 100, preferably 200, preferably 500, preferably 1000, psia. The liquid hydrogen typically will be stored as a refrigerated liquid not exceeding about 30-50 psia, and the pressure ratings described in the preceding sentence are preferred to provide a factor of safety.

The liquid level (of hydrogen) in the vessel 20 preferably is measured using a flexible temperature and liquid level sensing probe 70 that is arranged generally vertically within the vessel 20. Preferably, the sensing probe 70 extends from at or adjacent the base of the storage volume 25 of the vessel 20, up to a position at or adjacent the topmost portion or ceiling of the storage volume 25. Preferably, the sensing probe 70 is one as described in U.S. Pat. No. 6,431,750, the contents of which are incorporated herein by reference. In this embodiment, the sensing probe 70 is made from a number of adhered flexible dielectric strips with a series of temperature sensing units 71 disposed at spaced intervals along the length of the probe. The probe 70 is flexible at room temperature, and remains flexible at cryogenic temperatures at least down to about 60-80K. The temperature sensing units 71 are effective to measure cryogenic liquid hydrogen temperatures at different levels within the storage vessel 20, and can distinguish between cryogenic liquid hydrogen and cold hydrogen vapor as described in the aforementioned U.S. Patent. The preferred sensing probe 70 can be oriented generally into any length-wise shape within the contour of the vessel 20 to measure the temperature gradient of liquid hydrogen therein. Data from the temperature sensing units 71 indicate how full the vessel 20 is, and also are used to determine the required cooling duty for the OPTR 30 to maintain the vessel 20 at the desired temperature, e.g. at or below 20K (the boiling point of liquid hydrogen). Less preferably, other suitable cryogenic liquid sensing probes can be used, which generally are known or conventional in the art.

In the illustrated embodiment, the sensing probe 70 is located in a rigid housing or sheath 75 that conforms to the desired path of the probe 70 through the hydrogen storage volume 25. The sheath 75 has a plurality of spaced port holes 76 to permit free flow of hydrogen (liquid or gaseous) to facilitate intimate contact of the hydrogen with the sensing units 71. The sheath 75 holds the probe 70 in the desired conformation regardless of the dynamic flow conditions of the liquid hydrogen in the vessel 20. The sheath can be made from stainless steel, or any other suitable material for a cryogenic hydrogen environment. Alternatively, the rigid sheath can be provided having any suitable construction; e.g. it can be provided as a recessed groove or slot in the vessel inner wall, as a series of retainer structures that are fixed within the storage volume 25 and adapted to hold the probe 70, etc.

It will be evident from the above description, as well as from FIGS. 1-3 (particularly FIGS. 2-3), that the liquid storage vessel 20, the first thermal jacket 42 and the second thermal jacket 44 are provided as concentric toroids sharing a common axis of revolution 4, with each successive toroid having a larger cross-sectional diameter than the toroid it encloses. Throughout the rest of the specification, the concentric liquid storage vessel 20, first thermal jacket 42 and second thermal jacket 44 collectively are referred to as the liquid hydrogen storage assembly 99.

To assemble the liquid hydrogen storage assembly 99, first the liquid hydrogen storage vessel 20 is provided as described above. Then the copper tubing of the first thermal jacket 42 is wrapped around the outer wall of the vessel 20 and preferably is brazed or soldered thereto. Then a layer of super insulation 60 is provided over the first thermal jacket 42 and the enclosed vessel 20, with the second thermal jacket 44 embedded within the thickness (or provided between adjacent layers of) the super insulation 60. Alternatively, when walled thermal jackets are used, these jackets can be assembled from respective first and second clamshell halves, e.g., joined at seams via suitable or conventional techniques, such as vacuum flanges, or other conventional techniques known or devisable by persons of ordinary skill in the art.

The liquid hydrogen storage assembly 99 is housed within an outer housing 50. The housing 50 preferably is generally circular and defines a substantially toroidal passageway 52 at or adjacent its periphery that is dimensioned to accommodate the hydrogen storage assembly 99 therein. As best seen in FIGS. 1 and 3, the housing 50 preferably includes a first recessed annular portion 54, a second recessed annular portion 55, and first and second center plates 56 and 57. Alternatively, the recessed annular portions can be provided having the respective center plates formed integrally therewith or otherwise prefabricated (such as by welding) thereto. By recessed annular portion, it is meant that portions 54 and 55 each have a generally annular recess or valley such that when the portions 54 and 55 are joined together, the respective recesses define the toroidal passageway 52 referred to above.

The first and second recessed annular portions 54 and 55 are secured to one another by an interface flange 59. The first and second center plates 56 and 57 are secured to the respective first and second annular portions 54 and 55 by additional interface flanges 59. Preferably, the flanges 59 are effective to provide a vacuum seal between adjacent portions of the housing 50, such that a primary vacuum chamber 80 is defined by and within the space enclosed by first and second recessed annular portions 54 and 55, and first and second center plates 56 and 57. The primary vacuum chamber 80 preferably is maintained under vacuum at reduced pressure, preferably about or less than 10, 9, 8, 7, 6, 5, 4, 3, 2, 1, 0.5, 0.4, 0.3, 0.2, 0.1, 0.05, 0.01, psia, more preferably about or less than $10^{-2}$, preferably $10^{-3}$, preferably $10^{-4}$, preferably $10^{-5}$, torr. The primary vacuum chamber 80 acts as a further thermal insulation jacket surrounding the hydrogen storage assembly 99, and also the operative cold components of the OPTR 30 later described, shielding these components against heat transfer from the environment. In addition, by maintaining the chamber 80 under constant vacuum, leaks in either of the first or second refrigerant circuits (for first or second thermal jackets 42 or 44), or in the hydrogen storage vessel can be detected and monitored by monitoring the pressure in the chamber 80.

The hydrogen storage assembly 99 is suspended or secured within the housing 50 by a plurality of spacer supports 62 provided between the storage vessel 20 and the inner surface of at least the second (or bottom) annular portion 55. The supports 62 extend through holes cut or provided in the super insulation 60, and in between adjacent copper tubing windings of the respective first and second thermal jackets 42 and 44. The spacer supports 62 preferably are made from a low thermal conductivity material since they are in physical contact with both the liquid hydrogen storage vessel 20 (which holds liquid hydrogen 5) and the outer housing 50 (which interfaces the ambient atmosphere). Preferably, the spacer supports 62 are made from G-10 which is a known, conventional fiberglass insulation material suitable for this purpose. Alternatively, the spacer supports 62 can be made from another suitable fiberglass woven epoxy composite material such as Kevlar or S-glass, less preferably another suitable material having a low thermal conductivity.

The components of the housing 50 preferably are made from stainless steel, less preferably from lightweight graphite/epoxy material, less preferably some other material capable of sustaining a vacuum as described above within the primary vacuum chamber 80.

In addition to the primary vacuum chamber 80, a secondary chamber 90 is provided, apart from the chamber 80, to house the hydrogen conditioning equipment (vaporizer 92 and preheater 94) which generally is maintained at a relatively high temperature compared to the storage vessel 20 and the OPTR 30. The hydrogen conditioning equipment is used to condition the hydrogen into a suitable gaseous state (temperature and pressure) prior to being delivered (via delivery valve 96) to the hydrogen fuel intake system of a vehicle. In the illustrated embodiment, the secondary chamber 90 is provided and defined between the second recessed annular portion 55, the second center plate 57, and a third center plate 58 that is secured to the base of the portion 55 opposite the second center plate 57. Most preferably, the secondary chamber 90 also is maintained under vacuum, preferably $10^{-2}$ to $10^{-4}$ torr or lower, in order to prevent or minimize convective heat transfer from the relatively high temperature components housed therein to walls in common with the primary vacuum chamber 80. The secondary chamber 90 can be provided with insulation material, such as glass beads or perlite. When maintained under a constant vacuum, the pressure within secondary chamber 90 can be monitored to detect hydrogen leaks in any of the conditioning equipment or associated piping.

The hydrogen conditioning equipment preferably includes a vaporizer 92 and a preheater 94. In operation, cryogenic liquid hydrogen 5 flows through a delivery pipe 401 equipped with a liquid trap 402 to the vaporizer 92, where the cryogenic liquid is vaporized to provide a cold gas; e.g. 20-100K. On exit from the vaporizer 92, the cold hydrogen gas is delivered into a preheater 94 which further heats the gas to a suitable temperature (e.g. 270-300K) for delivery to a hydrogen-powered internal combustion engine (not shown) or to a hydrogen powered fuel cell (also not shown) via delivery valve 96. The vaporizer 92 and preheater 94 preferably are provided as conventional heat exchangers, suitable or adapted to operate with cryogenic fluids, and can be made from conventional materials. In a vehicle, these heat exchangers advantageously can be supplied with a "hot" fluid such as heated water, coolant or other suitable heated fluid from an associated reservoir or circulating system for that fluid in the vehicle. The necessary flow rates and temperatures for these "hot" fluids in the vaporizer 92 and preheater 94 will be determined based on the required heating duty to vaporize and preheat the hydrogen at the necessary flow rate for the gaseous hydrogen fuel, as will be understood by a person having ordinary skill in the art. Alternatively, the vaporizer 92 and/or preheater 94 can be electrically heated.

The delivery valve 96 can be provided as an electronically controlled metering valve, designed to respond to a throttle demand from the driver of a vehicle. Alternatively, other suitable or conventional control mechanisms for regulating the flow of hydrogen through the valve 96 can be used.

The foregoing description and FIGS. 1-3 have been provided based on a substantially toroidal hydrogen storage vessel 20, whose shape in geometric terms is a solid of revolution produced by revolving (or integrating) a circle about a non-intersecting axis, thereby defining a centrally located void space. However, it will be understood that the invention is not to be correspondingly limited to vessels and associated thermal jackets having a toroidal shape; other configurations, produced by the revolution of other, non-circular shapes about non-intersecting axes are possible, and are within the scope of the present invention. In addition, the storage vessel 20 can be produced by joining discrete sections, e.g. of pipe, to produce a closed hydrogen storage vessel that defines a void space at the center to accommodate the OPTR 30. The toroidal structure described above is preferred for ease of fabrication, and also for improved physical strength (bursting resistance) over the other configurations described in this paragraph, in part due to the absence of sharp bends in the vessel wall.

Thus far, the description has focused on the structure and function of the housing 50, the liquid hydrogen storage assembly 99 and the conditioning equipment. Though the storage vessel 20 is well shielded against ambient heat transfer via the primary vacuum chamber 80 and the super insulation 60, some degree of heat transfer into the vessel 20 inevitably will occur. This added thermal energy must be counteracted by removing an equivalent amount of thermal energy from the vessel 20 in order to maintain the liquid hydrogen 5 below its saturation temperature to avoid boil off and hydrogen overpressure. The OPTR 30, mentioned above, supplies the necessary cooling duty by refrigerating the refrigerant fluids circulating through the first and second thermal jackets 42 and 44, and its structure and operation will now be described.

Figures 4, 5:
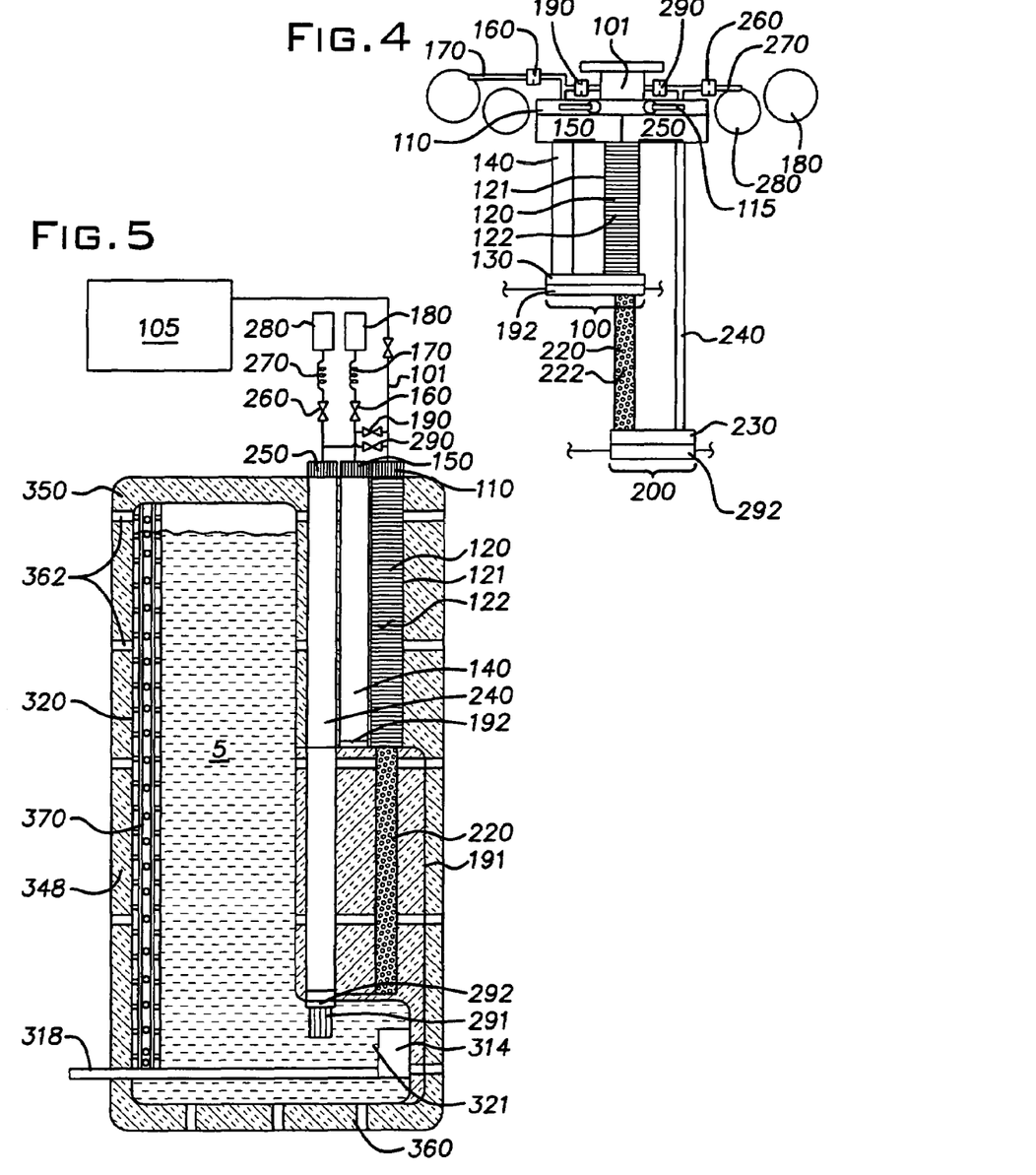
FIG. 4 is a close-up schematic view of the two-stage orifice pulse tube refrigeration unit shown in FIG. 1.
FIG. 5 is a schematic view, partially in section, of a liquid hydrogen storage system according to an alternate embodiment of the invention, including a generally rectilinear hydrogen storage vessel.

The OPTR preferably is provided mounted to or through the first center plate 56 as shown in FIGS. 1 and 3, such that the operative cold components are housed within the primary vacuum chamber 80 while warmer components are disposed outside the chamber 80. The OPTR 30 is shown in a close-up schematic, partially sectioned view in FIG. 4. The OPTR 30 has a first stage 100 and a second stage 200. Each stage is a separate orifice pulse tube refrigeration unit. Orifice pulse tube refrigeration units generally are known in the art, and are described for example by C. Wang et al., "A Two-stage Pulse Tube Cooler Operating Below 4K", Cryogenics, Volume 37, Number 3, 1997, pp. 159-164. In the present invention, each stage preferably has a U-tube configuration as shown in FIG. 4; i.e. the working fluid pathways from the first stage regenerator 120 to the first stage pulse tube 140, and from the second stage regenerator 220 to the second stage pulse tube 240, are U-shaped. As evident from FIGS. 1 and 3, the OPTR 30 preferably is oriented vertically in the hydrogen storage and delivery system 10. By vertically oriented, it is meant that the OPTR 30 is oriented such that the first stage regenerator 120 and the second stage regenerator 220 are oriented vertically or substantially vertically (relative to the gravity vector), such that the first and second stage cold heat exchangers 192 and 292 are located at or adjacent the bottom ends of the respective regenerators, opposite the first and second stage hot heat exchangers located at or adjacent the top ends.

The construction of the OPTR 30 is best understood from a description of the flow path of the working fluid which is an oscillatory gas (preferably helium) therethrough, beginning from an oscillatory gas pressure power source or gas compressor 105, shown schematically in the figures. As used herein, an oscillatory gas pressure power source is a device or machine that delivers or provides positive gas pressure in cyclic or recurring surges in a working fluid, preferably of substantially equal pressure and volume (mass) of gas per surge (referred to herein as oscillatory gas), measurable in surges or cycles per second, or Hertz (Hz). While helium is preferred for the working fluid, and the remaining description is provided for the case where the working fluid is helium, it will be understood that another suitable working fluid can be used in the OPTR 30.

Preferably, the oscillatory power source is a gas compressor 105, preferably an electric gas compressor, most preferably an electric flexure bearing linear drive compressor as will be further described. (The compressor 105 is omitted from FIGS. 2-3 to prevent obstruction of details that otherwise would be masked by its presence in these drawings).

First, it should be noted that the 'flow' of oscillatory gas (preferably helium) refers to the propagation of the oscillation generated in the working fluid (oscillatory gas) by the gas compressor 105, and conveyed to the OPTR 30 via transfer tube 101. Preferably, there is zero or negligible (or substantially negligible) bulk mass flow of the working fluid through the OPTR 30. In other words, individual helium atoms or quanta (assuming helium is the working fluid) oscillate between generally fixed points within the OPTR 30, preferably with zero or negligible net bulk flow. Without wishing to be bound to a particular theory, it is believed that the oscillation of upstream (more adjacent to the gas compressor 105) helium atoms is transferred to downstream (more distal from the gas compressor 105) helium atoms by a pressure effect; i.e. upstream helium atoms intermittently impact (at the oscillation frequency) helium atoms immediately adjacent and downstream of the upstream atoms, thereby causing the downstream helium atoms to oscillate in phase with the upstream atoms and so on. The sum of these pressure effects throughout the oscillatory helium flow path results in an overall pressure wave oscillation in the oscillatory helium within the OPTR 30 that is generated by the periodic pressure surges supplied from the gas compressor 105. With the above in mind, it is also understood and expected that the oscillating pressure wave may generate some bulk mass flow of oscillatory helium through the OPTR 30. It is not expected or intended that the absolute or bulk mass flow rate of oscillatory helium through the OPTR 30 must be zero; only that such flow rate is preferably zero or negligible.

Oscillation of the working fluid (preferably helium) is generated by the gas compressor 105. The gas compressor 105 preferably is an electric flexure bearing linear drive compressor, which is preferred for a number of reasons. First, it is electrically powered and electricity is readily available in a home, business, or on the vehicle to provide the energy needed to have a zero boil-off or no-vent storage system. The desired (ideal) operating frequency is 30 Hz, although a higher frequency between 30 and 60 Hz may be more desirable based on the heat absorptive materials used in the regenerators 120 and 220 (described below). It is not desirable to operate at less than 30 Hz because the compressor size will increase. The compressor operating frequency can be changed or regulated as a function of compressor input power should it be desirable to vary the frequency; e.g. in order to get higher operating frequencies if desirable in the 30-60 Hz range. The inventors herein have used a linear flexure bearing compressor at an operating frequency varied generally between 28 and 32 Hz. Flexure bearing compressors generally exhibit greater reliability and longevity, for example compared to rotary valve compressors (such as used by Wang et al., cited above) and other conventional gas compressors. Flexure bearing compressors have been shown to operate for 5 to 10 years with no failures.

Oscillatory helium enters the first stage 100 of the OPTR 30 through the first stage aftercooler 110. The aftercooler 110 absorbs a substantial portion of the heat of compression and dampens temperature oscillation in the oscillatory helium flow prior to entering the first stage regenerator 120. The first stage regenerator 120 has an exterior shell or housing 121 enclosing a highly porous heat absorptive material 122. Most preferably, housing 121 is made from stainless steel, and is insulated such that the regenerator 120 operates substantially adiabatically, or at least as adiabatically as possible. The heat absorptive material 122 has high heat capacity and preferably low to moderate thermal conductivity (if conductivity is too high, inefficiencies will occur due to heat transfer from the housing 121). Preferably, the thermal conductivity of heat absorptive material 122 is not more than 28, preferably not more than 24, preferably not more than 20, W/m-K at 60-100K, preferably 70-90K, preferably about 80K. Preferably, the heat absorptive material 122 in the first stage regenerator 120 has substantial heat capacity at a temperature of 60-100K, preferably 70-90K, preferably about 80K. The heat absorptive material 122 in the first stage regenerator 120 preferably has a volumetric heat capacity of at least 1 J/cm$^3$K, preferably 1.3 J/cm$^3$K, preferably 1.8 J/cm$^3$K, preferably 2.0 J/cm$^3$K, preferably 2.2 J/cm$^3$K, at 60-100K, preferably 70-90K, preferably about 80K. Also, the heat absorptive material 122 of the first stage regenerator 120 preferably has a porosity of at least 0.55, preferably 0.6, preferably 0.63, preferably 0.66 preferably 0.67, preferably 0.68. Preferably, the heat absorptive material 122 is a plurality of layers of stainless steel screen or mesh stacked axially or transversely within the housing 121. A fine stainless steel mesh is preferred, preferably having a mesh size of 60-800, preferably 100-700, preferably 200-600, preferably 300-500, preferably 400, mesh. The mesh size is small enough to ensure maximum surface area of contact, and therefore efficient heat transfer, between the mesh and the oscillatory gas, but large enough not to significantly impede the oscillatory flow of helium therethrough. Preferably, the pressure drop across the heat absorptive material 122 in first stage regenerator 120 is not more than 1 psi, preferably not more than 0.4 psi, preferably not more than 0.2 psi.

A first stage isothermal flow passage 130 connects the outlet of the first stage regenerator 120 to the inlet of the first stage pulse tube 140 via the first stage cold heat exchanger 192. The first stage cold heat exchanger 192 has a refrigerant fluid flow passage coupled to and in fluid communication with a refrigerant line 3 that is connected in line with the second thermal jacket 44. The first stage cold heat exchanger 192 can have any suitable conventional configuration. Optionally, the first stage isothermal flow passage 130 and cold heat exchanger 192 can be combined or integrated into a single unit.

It is preferred that the working fluid-side of cold heat exchanger 192 contains packed copper screen to increase convective heat transfer area for the working fluid, effectively increasing heat transfer between the working fluid and the refrigerant fluid in the heat exchanger 192. The preferred copper screen mesh size is 60-150, preferably 80-120, preferably 100, mesh.

In addition to the first stage cold heat exchanger 192, oscillatory helium flow also is delivered from the outlet of the first stage regenerator 120 to the inlet of the second stage regenerator 220. In other words, oscillatory helium flow is split at the outlet of the first regenerator 120, with part of the oscillatory helium flow being directed to the first stage cold heat exchanger 192 as just described, and the remainder being directed to the second stage regenerator 220. In a preferred embodiment, the first stage cold heat exchanger 192 is provided with a single inlet and two outlets, one leading to the first stage pulse tube 140 and the other leading to the second stage regenerator 220. In this embodiment, the first stage cold heat exchanger 192 serves two functions; in addition to being the first stage cold heat exchanger of the first stage 100, where the refrigerant fluid circulated through the second thermal jacket 44 is refrigerated, it also serves as an aftercooler for the second stage 200 pulse tube refrigeration unit to regulate the initial helium temperature on entry into the second stage regenerator 220, and to dampen temperature oscillations on entry therein.

Continuing with the first stage 100, oscillatory helium flow enters the first stage pulse tube 140 from the first stage cold heat exchanger 192. The first stage pulse tube 140 preferably is made from stainless steel. A first stage hot heat exchanger 150 is located immediately downstream of the first stage pulse tube 140 which is preferably cooled by water or coolant, e.g. using the vehicle's coolant system via conduit 115. Optionally, the hot heat exchanger 150 can be cooled via a forced air cooling system (not shown). Preferably, the first stage hot heat exchanger 150 is a shell-and-tube heat exchanger, less preferably plate-and-fin, less preferably another suitable configuration, and preferably it is made from copper. The tube side of hot heat exchanger 150 is packed with copper screen having a mesh size of 60-150, preferably 80-120, preferably 100, mesh, to increase heat transfer between the working fluid on the tube-side of hot heat exchanger 150 and the tube wall which is cooled by water on the shell side. Preferably, the first stage hot heat exchanger 150 operates isothermally at substantially ambient temperature, preferably 300K. The first stage 100 also has a first stage primary orifice 160, inertance tube 170 and reservoir volume 180, which are generally known components of an orifice pulse tube refrigerator, and help improve and/or control refrigeration power at the first stage cold heat exchanger 192. Preferably, inertance tube 170 and reservoir volume 180 are made from stainless steel. In the preferred embodiment of FIGS. 1-3, the first stage reservoir volume 180 is a toroid so that it fits conveniently within the overall structure of the system 10 as shown, yet still provides adequate reservoir volume. In addition, the inertance tube 170 can be several meters in length, and may be coiled up or wound so that it fits within the space provided.

The first stage 100 also preferably has a secondary orifice 190 connecting the first stage hot heat exchanger 150 to the transfer tube 101. It has been found for an orifice pulse tube refrigerator that by tuning the secondary orifice 190, one can further improve cooling efficiency and reduce the operating temperature of the cold heat exchanger 192 of the first stage 100 refrigeration unit.

Turning now to the second stage 200 refrigeration unit, oscillatory helium flow is introduced into the second stage regenerator 220 from the first stage cold heat exchanger 192 as previously described. The second stage regenerator 220 has similar construction to the first stage regenerator 120, preferably having a second stage regenerator housing made from stainless steel. The heat absorptive material 222 in the second stage regenerator 220, however, preferably has adequate heat capacity at or near the temperature of the cryogenic liquid hydrogen being stored in the storage vessel 20, e.g. 13-20K. Preferably, the heat absorptive material 222 in the second stage regenerator 220 is or comprises a rare earth metal or rare earth metal compound, preferably an erbium compound, more preferably an erbium-praseodymium compound, preferably in the form of spheres, less preferably some other discrete shape, less preferably in a matrix such as fixed particles on a porous substrate. When spheres are used, preferably the spheres have a mean diameter of 60 to 100 microns, more preferably 70 to 90 microns, most preferably 80 to 85 microns. Less preferably, the heat absorptive material 222 can be in any form that does not substantially raise the pressure drop across second stage regenerator 220, and still provides high surface area of contact between the heat absorptive material 222 and the oscillatory helium gas. The heat absorptive material 222 in the second stage regenerator 220 preferably has a volumetric heat capacity of at least 0.23 $J/cm^3K$, preferably 0.4 $J/cm^3K$, preferably 0.6 $J/cm^3K$, preferably 0.75 $J/cm^3K$, most preferably 0.82 $J/cm^3K$ at 13-14K, and a volumetric heat capacity of at least 0.5 $J/cm^3K$, preferably 0.6 $J/cm^3K$, preferably 0.7 $J/cm^3K$, most preferably 0.80 $J/cm^3K$ at 18-20K. Also, the heat absorptive material 222 of the second stage regenerator 220 preferably has a porosity of 0.2-0.5, preferably 0.3-0.45, preferably 0.36-0.4, preferably about 0.38.

Oscillatory helium flow exits the second stage regenerator 220 via second stage isothermal flow passage 230, and enters the second stage pulse tube 240 (preferably made from stainless steel) via the second stage cold heat exchanger 292. Cold heat exchanger 292, preferably has similar construction, and is constructed of similar materials, as the first stage cold heat exchanger 192. The second stage cold heat exchanger 292 is where net refrigeration for the second stage 200 occurs. Analogous to the first stage cold heat exchanger, the second stage cold heat exchanger 292 also has a refrigerant fluid flow passage that is coupled to and in fluid communication with a refrigerant line 4 that is connected in line with the first thermal jacket 42. The second stage cold heat exchanger 292 can have any suitable conventional configuration. Optionally, the second stage isothermal flow passage 230 and cold heat exchanger 292 can be combined or integrated into a single unit.

Analogous to the first stage cold heat exchanger 192, it is preferred that the working fluid-side of cold heat exchanger 292 contains packed copper screen to increase convective heat transfer area for the working fluid, effectively increasing heat transfer between the working fluid and the refrigerant fluid in the heat exchanger 292. The preferred copper screen mesh size is 60-150, preferably 80-120, preferably 100, mesh. The oscillatory helium flow continues through the second stage pulse tube 240, and is delivered to the second stage hot heat exchanger 250, second stage primary orifice 260, inertance tube 270 and reservoir volume 280, similarly as for the first stage 100. The second stage inertance tube 270 and reservoir volume 280 are preferably made from stainless steel, and in the embodiment of FIGS. 1-3, the reservoir volume 280 also is provided as a toroid, similar to the first stage reservoir volume 180. The second stage hot heat exchanger 250 preferably is of similar construction and materials as first-stage hot heat exchanger 150, it is operated isothermally at substantially ambient temperature (preferably 300K), and is cooled by cooling water or coolant via conduit 115 along with first stage hot heat exchanger 150. In addition, like the first stage 100, second stage 200 also preferably has a secondary orifice 290 connecting the second stage hot heat exchanger 250 to the transfer tube 101.

Optionally and preferably, the first and second stage hot heat exchangers 150 and 250 and the first stage aftercooler 110 can be provided as an integrated structure as part of a common thermal block, or as thermally coupled blocks, all cooled by cooling water or coolant via the conduit 115.

Preferably, all the operative cold components of the OPTR 30 (including first and second stage regenerators 120,220, pulse tubes 140,240, isothermal flow passages 130,230 and cold heat exchangers 192,292) are covered or wrapped with at least 0.1, preferably 0.3, preferably 0.5, preferably 0.8, preferably 0.9, preferably 1, inch of super insulation material as described above, and are housed within the primary vacuum chamber 80 to minimize or prevent ambient heat transfer thereto.

In operation, the liquid hydrogen storage system 10 functions as follows.

Initially, the OPTR 30 is charged with a working fluid, preferably helium gas, at 200-1000, preferably 300-900, preferably 400-700, preferably 430-600, preferably 450-550, preferably 480-530, preferably 490-510, preferably about 500, psia. The gas compressor 105 provides oscillatory gas pressure to operate the OPTR 30. Oscillatory helium flow generated by the gas compressor 105 is delivered to the OPTR 30 through transfer tube 101.

It will be understood that helium oscillation within the OPTR 30 results in an oscillatory pressure ratio ($P_{max}/P_{min}$) between the compressive and expansive phases of a given quantum of helium. This pressure ratio varies with position in the helium flow path through the OPTR 30. The larger the pressure ratio the greater power generated. The preferred pressure ratio at the inlet to the first stage pulse tube 140 is 1-1.3, preferably 1-1.25, preferably 1.1-1.23, preferably 1.15-1.22, preferably 1.2. The preferred pressure ratio upon exiting the gas compressor 20 is 1.2-1.4, preferably 1.25-1.35, preferably 1.26-1.34, preferably 1.28-1.32, preferably 1.3.

Beginning with the first stage 100, the first stage regenerator 120 receives oscillatory helium flow from the transfer tube 101. As the helium gas oscillates, it undergoes successive compression and expansion cycles, each quantum of helium gas experiencing a temperature increase with compression and a temperature decrease with expansion. Within the first stage regenerator 120, the heat absorptive material 122 absorbs the heat of compression from a quantum of helium gas during the compression phase, and delivers that stored heat energy back to the gas during the expansion phase. This net effect proceeds down the length of the regenerator 120 until at the first stage isothermal flow passage 130, the temperature of the helium gas has been reduced to substantially the operating temperature of the first stage cold heat exchanger 192, preferably 60-100, preferably 70-90, preferably about 80, degrees Kelvin. Thus, oscillatory helium delivered to the first stage cold heat exchanger 192 from the first stage regenerator 120 causes substantially no net heating effect (either heating or cooling) at the first stage cold heat exchanger 192. That is, the oscillating helium arrives at the first stage regenerator 120 already cooled to the steady state operating temperature of the regenerator 120.

The first stage cold heat exchanger 192 preferably is operated isothermally at steady state, preferably at 40-120, preferably 50-110, preferably 60-100, preferably 70-90, preferably about 80, degrees Kelvin. The refrigerant circulating through the cold heat exchanger 192 (and the second thermal jacket 44) preferably is helium, though nitrogen also is suitable at operating temperatures of about 80K. At the first stage cold heat exchanger 192, the oscillatory helium flow is split as described above. With respect to the first stage pulse tube 140, oscillatory helium gas within the pulse tube 140 shuttles heat energy from the cold heat exchanger 192 against the temperature gradient in pulse tube 140 as known in the art, to be expelled via the first stage hot heat exchanger 150. In this manner, net refrigeration power is generated at the cold heat exchanger 192 effective to refrigerate the refrigerant fluid being circulated therethrough and through the second thermal jacket 44 via pump 8. In this manner, the second thermal jacket 44 is maintained at low temperature, preferably about 80K, via circulation of the refrigerant through the jacket 44 via line 3 and pump 8, and is effective to abate heat transfer from the ambient atmosphere toward the liquid storage vessel 20.

Oscillatory helium flow also is delivered to the second stage regenerator 220 from the first stage cold heat exchanger 192 as described above. Analogous to the first stage regenerator 120, the second stage regenerator 220 lowers the helium temperature from that of the first stage cold heat exchanger 192 to substantially that of the second stage cold heat exchanger 292. It is important to minimize heat transfer to the second stage cold heat exchanger 292 from the first stage 100 refrigeration unit in order to maximize cooling efficiency at the cold heat exchanger 292. Therefore, the heat absorptive material 222 used in the second stage regenerator 220 is specially selected to ensure maximum cooling of the oscillatory helium prior to entering the second stage cold heat exchanger 292. As stated above, the heat absorptive material 222 in second stage regenerator 220 preferably is a rare earth metal or metal compound.

Cold heat exchanger 292 preferably operates isothermally, preferably at a temperature of 13-20K. Preferably, the refrigerant fluid circulating through the second stage cold heat exchanger 292 (and the first cooling jacket 42) is helium.

Oscillatory helium gas within the second stage pulse tube 240 shuttles heat energy from the second stage cold heat exchanger 292, to be expelled via the second stage hot heat exchanger 250 as known in the art. The second stage 200 (second stage pulse tube 240) thereby generates net refrigeration power at the cold heat exchanger 292, similarly to the first stage 100 (and first stage pulse tube 140). The net refrigeration power at the cold heat exchanger 292 is effective to refrigerate the refrigerant fluid being circulated therethrough and through the first thermal jacket 42 via pump 9. In this manner, the first thermal jacket 42 is maintained at low temperature, preferably about 13-20K, via circulation of the refrigerant through the jacket 42 via line 4 and pump 9, and it is effective to further abate heat transfer from the ambient atmosphere toward the liquid storage vessel 20, and to maintain the vessel 20 in the range of 13-20K. The result is that liquid hydrogen 5 within the vessel 20 is maintained below its saturation or boiling point temperature, and vaporization and boil off are minimized or prevented. This reduces or eliminates the need to vent gaseous hydrogen to relieve hydrogen overpressure because none or substantially none is generated.

It should be noted there is no fluid communication between either the first or second thermal jackets 42 or 44 (or the associated refrigerant lines 4 or 3) and the working fluid pathway in the OPTR 30, even though helium is the preferred working fluid in the OPTR and helium also can be and preferably is used as a refrigerant for one or both of the thermal jackets.

The pumps 8 and 9 that pump the refrigerant fluids through the respective second and first thermal jackets 44 and 42 preferably are low pressure drop, low flow rate pumps as known in the art. Preferably, the pumps 8 and 9 have a pressure drop of less than 0.1 psi, less preferably 0.5 psi, and are designed to be operated at the respective operating temperatures of the refrigerants (~60-120K and ~13-20K). The pump 9 used to circulate the more highly refrigerated refrigerant fluid (T~13-20K) can be actively cooled through heat exchange with the relatively high temperature refrigerant fluid line 3 as illustrated in FIG. 1. This ensures the least possible heat transfer to the low temperature refrigerant in the line 4 due to heat generation at the pump 9.

The gas compressor 105 used to drive the OPTR 30 can be powered from any one of three power sources depending on the state of the vehicle: external, vehicle alternator/battery power, or hydrogen/air fuel cell power. An external source of power is preferred when the vehicle is parked or not in use. It is contemplated that parking spaces for hydrogen-powered automobiles could be equipped with power couplings or power sockets at relatively little expense; the driver simply would "plug in" his automobile once parked in order to continue providing power to the gas compressor 105. However, it is noted that the storage vessel 20 is very well insulated and it is anticipated that the system could sit dormant for a reasonable period of time, such as 1-2 days, before it would be necessary to engage the OPTR 30 to cool the vessel 20 to relieve hydrogen overpressure. Thus, if a vehicle will be parked for a relatively short time, such as less than 2 days, it probably would be unnecessary to connect the OPTR to power during that time. When the vehicle is running or in use, then the power to drive the compressor 105 is supplied from the vehicle's own electrical system or alternator to run the OPTR 30 and generate refrigeration power.

In the case where the vehicle is to remain off for long periods of time and no external power source is available, a hydrogen/air fuel cell power system can be provided and employed as follows. With no power to drive the gas compressor 105, eventually liquid hydrogen within the vessel 20 will vaporize and require venting. The headspace of the inner vessel 20 is equipped with a hydrogen vent 107 that is designed to release hydrogen overpressure at a certain cracking pressure of an overpressure valve (not shown). For example, the hydrogen vent 107 can be or utilize a resealable pressure relief valve that cracks at a certain cracking pressure, allowing hydrogen overpressure to escape. The valve reseals once the overpressure has subsided below the valve cracking pressure. Resealable pressure relief valves are known or conventional in the art, and any such valve can be used so long as it is compatible with hydrogen and with the temperatures it will experience (e.g. 20K).

The vented hydrogen gas is delivered to a hydrogen/air fuel cell that converts the vented hydrogen into electricity. Hydrogen/air fuel cells are well known in the art; the products of such a fuel cell are water and electricity. In this embodiment, the water is discarded and the electricity can be stored in onboard batteries or used directly to drive the gas compressor 105. As hydrogen is vented, the electricity generated charges onboard batteries which power the gas compressor 105 to recool the liquid hydrogen remaining in the vessel 20 below its saturation temperature, causing vaporization to cease and resulting in a loss of hydrogen overpressure and the closure of the hydrogen vent 107. The overall result is that vented hydrogen is converted into electricity in a closed system so there is no net hydrogen venting to the atmosphere from the vehicle. The generated electricity is used to charge onboard batteries used to power the compressor 105 to recool the liquid hydrogen and thereby stop further venting. It will be understood that for a long period of nonuse of the vehicle, eventually all of the liquid hydrogen would be depleted. But, by the present invention the depletion rate is greatly reduced compared to straight hydrogen venting, resulting in significant cost and energy savings. In addition, the invention also prevents hydrogen venting to the atmosphere, eliminating a significant hazard heretofore associated with hydrogen-powered automobiles or other vehicles that has largely inhibited further development by automobile manufacturers.

Liquid hydrogen 5 is delivered into the storage vessel 20 through a fill line 108 extending through the housing 50, super insulation 60 and the first and second thermal jackets 42 and 44, into the vessel 20, and provided centrally within the vent line 107. Cold gaseous hydrogen that vaporizes during the filling process, which is not recondensed on the cold vessel 20 wall, vents through the vent line 107 and keep the liquid fill line 108 cold, thus reducing further hydrogen vaporization.

It has been estimated experimentally that for a toroidal vessel 20 insulated as described in the disclosed construction and sized to hold 10 kg of liquid hydrogen, the amount of ambient heat transfer into the vessel 20, at an ambient temperature of about 300K, is about 1 watt. Based on this determination, about 1 watt of refrigeration power at the second stage cold heat exchanger 292, operating at 13K, and about 4-5 watts of refrigeration power at the first stage cold heat exchanger 192, operating at 80K, is sufficient to counteract ambient heat transfer into the vessel 20 given the construction (first and second thermal jackets 42 and 44, super insulation 60 and primary vacuum chamber 80) described herein, and further to cool liquid hydrogen in the vessel 20 below 20K. It is important to note that 4-6 watts of refrigeration power is sufficient to sustain the liquid hydrogen without boil-off because the hydrogen is delivered to the vessel 20 as a cryogenic liquid, already at or below 20K. Therefore, refrigeration power is necessary only to counteract the rate of ambient heat transfer into the vessel 20, and not to extract latent heat of vaporization to condense gaseous hydrogen. The OPTR 30 generally is not used to condense gaseous hydrogen to provide cryogenic liquid; though it could be used for this purpose, but would require a substantial amount of time at 4-6 watts of refrigeration power, assuming room temperature hydrogen gas as the starting fluid.

In the preferred embodiment described above, the OPTR 30 can be scaled such that the first stage cold heat exchanger 192 operates at about 80K and is effective to refrigerate the refrigerant circulating through the second thermal jacket 44 (i.e. to remove thermal energy therefrom) at a rate of about 5 watts, and the second stage cold heat exchanger 292 operates at about 13K and is effective to refrigerate the refrigerant circulating through the first thermal jacket 42 at a rate of about 1 watt. Thirteen degrees Kelvin is the triple point of hydrogen, and represents the densest possible condition for liquid hydrogen. It is important to note that operating at 13K and 1 watt, the second stage cold heat exchanger 292 is designed to counteract or balance against the rate of ambient heat transfer into the inner vessel 20 in order to maintain the liquid hydrogen at or near its triple point; it will be less effective at removing sensible heat to supercool saturated liquid hydrogen at 20K down to its triple point temperature of 13K. The second stage cold heat exchanger 292 will operate at somewhat higher power (e.g. 2 or 3 watts or more) at higher temperatures (up to 20K) without rescaling the OPTR, effective to remove more thermal energy from the vessel 20 and the liquid hydrogen within.

However, the OPTR 30 can be scaled to deliver a higher degree of refrigeration power at the second stage cold heat exchanger 292. For example, the OPTR 30 can be scaled to provide, 1, 2, 3, 4, 5, 6, 7, 8, 9, 10, etc., watts of refrigeration power at the second stage cold heat exchanger 292. The preferred method for scaling the OPTR 30 is to adjust the diameter of the oscillatory helium flow path for each component within the OPTR 30 while keeping the length of each component essentially constant. Increased power for refrigeration requires additional mass flow rate. It will be understood that increasing the diameter (cross-sectional area) of the helium flow path through each component of the OPTR 30 to accommodate increased mass (and therefore volumetric) flow results in a constant oscillatory helium velocity independent of refrigeration power. It is preferred to maintain a constant oscillatory helium velocity when scaling the invented liquid hydrogen storage system 10. The above scaling method is particularly preferred for non-hollow tube components such as the regenerators 120,220.

In addition to the system as described above for storing cryogenic liquid hydrogen 5 in the vessel 20, the system can be optimized for storing low temperature, high pressure gaseous hydrogen as well. In this embodiment, the vessel 20 must be constructed of suitable material and suitable wall thickness to withstand high pressure gas, e.g. up to 9000, 10,000 or 12,000 psia, or higher. In order to store a comparable mass of hydrogen in the gaseous state (relative to liquid hydrogen), it will be necessary to compress the hydrogen to at least about 7500 psia. This can be achieved by maintaining the hydrogen gas at low temperature, e.g. in the range of 70-100, preferably about 80, degrees Kelvin. If such high pressure, low temperature hydrogen gas is to be stored in the vessel 20, then only the first stage 100 of the OPTR 30 (and only one thermal jacket 44) described above is required to supply the necessary cooling duty at about 80K. That is, instead of the two-stage OPTR described above, only a single stage operating at a steady state temperature (cold heat exchanger 192) of about 70-100, preferably 80, degrees Kelvin need be used. The advantages of this system over the low pressure liquid hydrogen system 10 described above include: less refrigeration power required to sustain the hydrogen, nitrogen gas can be used as the refrigerant fluid instead of helium which is necessary for lower temperatures such as 20K, and it has a decreased parts count, which may lead to lower total capital cost. Disadvantages of this high pressure, low temperature gaseous system are that the hydrogen must be maintained at a pressure of at least 7500 psia at 80K to achieve comparable density to liquid hydrogen, and the system may be heavier than the low pressure liquid system due to the thickness of the high pressure storage vessel wall. In addition, the gaseous storage system inherently is more dangerous than the liquid system because of the high energy (high pressure) state of the hydrogen.

Referring now to FIG. 5, an alternate embodiment of the invention is shown. In this embodiment, the liquid hydrogen storage vessel 320 is provided generally as a rectilinear vessel having a sump region 321 at or adjacent the bottom of the vessel 320.

The storage vessel 320 is fixed within an outer housing 350 via low conductivity spacer supports 362 provided between the inner vessel 320 and the housing 350. The spacer supports 362 preferably are made from similar materials as described above for the spacer supports 62 in FIGS. 1-3. An intermediate or interpositional space 348 is provided and defined between the housing 350 and the vessel 320. The interpositional 348 space preferably is maintained under vacuum to provide a vacuum chamber as described above. In addition, the interpositional space 348 is provided with super insulation 360, also as described above.

In this embodiment, both first 100 and second 200 stages of the OPTR 30 are enclosed or partially enclosed within a radiation shield 191, which is thermally coupled to and cooled by the first stage cold heat exchanger 192. Preferably, at least the second stage regenerator 220 and a portion of the second stage pulse tube 240 are located within the radiation shield 191. Preferably, the radiation shield 191 is made from thin-walled aluminum, and is cooled to or maintained at a temperature of about 80K by the first stage cold heat exchanger 192. The 80K aluminum radiation shield presents an additional barrier against thermal radiation from the ambient atmosphere into the OPTR components, and also toward the base of the storage vessel 320 where the liquid hydrogen has the greatest surface contact due to gravity. Preferably, the radiation shield 191 encloses at least the sump region 321 of the vessel 320.

In this embodiment, the second stage cold heat exchanger is thermally coupled to a heat transfer body such as a fin or fin structure 291 projecting from the inner wall of the storage vessel 320, directly into liquid hydrogen in the sump region 321. The fin structure 291 can comprise one or a plurality of extending heat transfer fins as is known in the art. In the second stage cold heat exchanger 292 heat energy is removed from the liquid hydrogen directly via fin structure 291 within the sump region 321, instead of using a refrigerant fluid, to maintain the liquid hydrogen below its saturation temperature. The second stage cold heat exchanger 292 extracts thermal energy from the fin structure 291 to which it is thermally coupled, thereby cooling the cryogenic liquid hydrogen within the storage vessel 320. Consequently, there is no or substantially no boil-off of liquid hydrogen, and therefore no need to vent hydrogen overpressure.

The sump region 321 acts as a reservoir for cooled liquid hydrogen that has been cooled by the fin structure 291. A fill/drain pipe 318 is connected to a pump 314 and provides fluid communication between the pump 314 and a fill/drain port located at the exterior of the housing 350. Liquid hydrogen fuel can be added to or extracted from the storage vessel 320 through the fill/drain pipe 318 by operation of the pump 314. The fill/drain pipe 318 is made from conventional materials capable of withstanding the temperature gradient it will experience (i.e. ambient temperature outside the outer housing 350 down to cryogenic liquid hydrogen temperatures within the vessel 320 (13-20K). The fill/drain pipe 318 can be used to fill the vessel 320 with liquid hydrogen (as during refueling) and also to supply hydrogen fuel to an engine or to a fuel cell in a vehicle (not shown). Providing only a single fill/drain pathway eliminates a potential conductive heat transfer pathway from the ambient environment into the vessel 320 by eliminating a second fill or drain pipe. A suitable T-valve or other conventional valve or manifold structure or assembly can be used to permit liquid hydrogen delivery into the vessel 320 for refueling, as well as hydrogen fuel delivery to an automobile engine (or fuel cell) during operation.

A hydrogen delivery manifold can be equipped with appropriate metering equipment for metering the amount of liquid hydrogen withdrawn from the storage vessel 320 and delivered to an engine's combustion chamber or to a hydrogen powered fuel cell, e.g. in an automobile.

The liquid level (of hydrogen) in the vessel 320 preferably is measured using a flexible temperature and liquid level sensing probe 370 similar to that described above.

In the most preferred embodiment liquid hydrogen is maintained at or near its triple point of about 13K, the densest possible condition for liquid hydrogen. This results in approximately 7 percent greater hydrogen mass for a given storage volume compared to saturated liquid hydrogen at 20K, which is what would be present in a conventional vented liquid hydrogen tank with no refrigeration. Benefits include reduced vessel size and consequent reduced vehicle mass for the same hydrogen storage capacity.

Another principal advantage of a liquid hydrogen storage system 10 according to the invention is that it eliminates the need for venting hydrogen from the storage vessel 20,320 so long as a power source is available to operate the oscillatory power source. In addition, when a hydrogen/air fuel cell system is included as described above, atmospheric hydrogen venting is completely eliminated even if the vehicle is off or immobile for long periods. The substantial reduction or elimination of hydrogen venting is a necessity for the world to operate in a hydrogen economy as opposed to an oil economy. It would be cost prohibitive to provide venting and burn-off facilities at every location a vehicle will be parked for long periods. The elimination of hydrogen venting provides for significantly safer operation of hydrogen-powered automobiles and other vehicles.

Still another advantage is that the invented system 10 is effective to maintain liquid hydrogen at or below the boiling point without venting, yet contains substantially no moving parts. The result is a system that is reliable, simple to operate, and easily maintained. The invention also is inherently stable which increases reliability.

Although the hereinabove described embodiments of the invention constitute the preferred embodiments, it should be understood that modifications can be made thereto without departing from the spirit and the scope of the invention as set forth in the appended claims.

What is claimed is:

1. A hydrogen storage and delivery system comprising a liquid hydrogen storage vessel in the shape of a hollow toroid having an interior surface that defines a hydrogen storage volume of the storage vessel, substantially vertically oriented orifice pulse tube refrigerator extending in a void space that is defined by said toroidal storage vessel and is located at the geometric center thereof, and a cooling system coupled to the orifice pulse tube refrigerator, said cooling system being adapted to counteract or abate heat transfer to the storage vessel from the ambient environment, -and wherein no cold heat exchanger of said orifice pulse tube refrigerator penetrates the liquid hydrogen storage vessel.

2. The system according to claim 1, said cooling system comprising a first thermal jacket exterior to and substantially enclosing said storage vessel, and a second thermal jacket exterior to and substantially enclosing said first thermal jacket.

3. The system according to claim 2, said cooling system further comprising a super insulation material disposed around and substantially enclosing at least said storage vessel and said first thermal jacket.

4. The system according to claim 2, said orifice pulse tube refrigerator comprising a first stage orifice pulse tube refrigeration unit and a second stage orifice pulse tube refrigeration unit that operates at a lower temperature than the first stage refrigeration unit, said first stage refrigeration unit being thermally coupled to said second thermal jacket, and said second stage refrigeration unit being thermally coupled to said first thermal jacket.

5. The system according to claim 4, said first stage refrigeration unit comprising a first stage cold heat exchanger having a first refrigerant fluid flow passage that is coupled to and in fluid communication with said second thermal jacket, said second stage refrigeration unit comprising a second stage cold heat exchanger having a second refrigerant fluid flow passage that is coupled to and in fluid communication with said first thermal jacket,
wherein a first refrigerant fluid, refrigerated at said first stage cold heat exchanger to a first temperature, is circulated through said second thermal jacket during operation of said system,
and wherein a second refrigerant fluid, refrigerated at said second stage cold heat exchanger to a second temperature, is circulated through said first thermal jacket during operation of said system.

6. The system according to claim 5, said first temperature being 60-100K.

7. The system according to claim 5, said second temperature being 13-20K.

8. The system according to claim 1, said cooling system comprising a heat transfer body projecting directly into a hydrogen storage volume of said storage vessel, said heat transfer body being thermally coupled to said orifice pulse tube refrigerator.

9. The system according to claim 8, said heat transfer body comprising a heat transfer fin.

10. The system according to claim 1, further comprising an oscillatory gas pressure power source coupled to said orifice pulse tube refrigerator via a transfer tube,
said orifice pulse tube refrigerator comprising a first stage orifice pulse tube refrigeration unit and a second stage orifice pulse tube refrigeration unit, each of the first and second stage refrigeration units comprising a respective regenerator, cold heat exchanger, pulse tube, hot heat exchanger, primary orifice, inertance tube, and reservoir volume,
each of the first and second stage refrigeration units further comprising a secondary orifice connecting the respective hot heat exchanger to the transfer tube.

11. The system according to claim 1, said cooling system comprising a first thermal jacket in the shape of a toroid located concentrically adjacent and substantially enclosing the liquid hydrogen storage vessel.

12. The system according to claim 11, said first thermal jacket comprising a length of tubing coiled in the shape of a toroid around the storage vessel and adapted to accommodate a flow of a first refrigerant fluid therethrough.

13. The system according to claim 12, said tubing having at least one flat side extending longitudinally along the tubing's outer surface, said tubing being wound around said storage vessel such that said flat side of said tubing is in direct contact with said storage vessel.

14. The system according to claim 12, said tubing of said first thermal jacket being soldered or brazed directly to said storage vessel.

15. The system according to claim 11, said first thermal jacket being in fluid communication with a refrigerant fluid flow passage of said orifice pulse tube refrigerator for circulating a first refrigerant fluid, refrigerated by said orifice pulse tube refrigerator, through said first thermal jacket.

16. The system according to claim 11, said cooling system further comprising a second thermal jacket in the shape of a toroid located concentrically adjacent and substantially enclosing said first thermal jacket.

17. The system according to claim 16, said second thermal jacket comprising a length of tubing coiled in the shape of a toroid and adapted to accommodate a flow of a second refrigerant fluid therethrough.

18. The system according to claim 16, said orifice pulse tube refrigerator comprising a first stage orifice pulse tube refrigeration unit and a second stage orifice pulse tube refrigeration unit that operates at a lower temperature than the first stage refrigeration unit,
said second thermal jacket being in fluid communication with a first refrigerant fluid flow passage of said first stage refrigeration unit for circulating a first refrigerant fluid, refrigerated by said first stage refrigeration unit, through said second thermal jacket,
said first thermal jacket being in fluid communication with a second refrigerant fluid flow passage of said second stage refrigeration unit for circulating a second refrigerant fluid, refrigerated by said second stage refrigeration unit, through said first thermal jacket.

19. The system according to claim 18, said first refrigerant fluid flow passage being located in a first stage cold heat exchanger of said first stage refrigeration unit, and said second refrigerant fluid flow passage being located in a second stage cold heat exchanger of said second stage refrigeration unit.

20. The system according to claim 16, said cooling system further comprising super insulation material disposed around and substantially enclosing said storage vessel and said first thermal jacket, said second thermal jacket being provided or embedded within, or between adjacent layers of, said super insulation material.

21. The system according to claim 1, further comprising an outer housing defining a primary vacuum chamber therein, said liquid hydrogen storage vessel and said cooling system being disposed within said primary vacuum chamber.

22. The system according to claim 21, wherein operative cold components of said orifice pulse tube refrigeration unit are disposed within said primary vacuum chamber.

23. The system according to claim 21, said primary vacuum chamber being maintained at about or less than $10^{-4}$ torr.

24. The system according to claim 21, said housing further defining a secondary chamber, separate and apart from said primary vacuum chamber, said system further comprising relatively high temperature hydrogen conditioning equipment disposed within said secondary chamber.

25. The system according to claim 24, said secondary chamber being maintained under vacuum at about or less than $10^{-2}$ torr.

26. The system according to claim 24, said hydrogen conditioning equipment comprising a vaporizer coupled to said hydrogen storage vessel via a delivery pipe and adapted to receive liquid hydrogen therefrom, and a preheater coupled to said vaporizer and adapted to receive vaporized hydrogen therefrom, said preheater being further adapted to heat hydrogen gas vaporized in the vaporizer to a suitable temperature for delivery to a hydrogen-powered internal combustion engine or to a hydrogen-powered fuel cell.

27. The system according to claim 26, said delivery pipe being equipped with a liquid trap.

28. The system according to claim 1, said orifice pulse tube refrigerator comprising a first stage orifice pulse tube refrigeration unit and a second stage orifice pulse tube refrigeration unit that operates at a lower temperature than the first stage refrigeration unit, each of the first and second stage refrigeration units comprising a respective regenerator, cold heat exchanger, pulse tube and hot heat exchanger, said first stage regenerator having a first heat absorptive material therein, said first heat absorptive material having a thermal conductivity not more than 28 W/m-K at 60-100K, a volumetric heat capacity of at least 1 J/cm$^3$K at 60-100K, and a porosity of at least 0.55.

29. The system according to claim 28, said first heat absorptive material being provided as a plurality of layers of stainless steel screen or mesh stacked axially or transversely within said first stage regenerator, said plurality of layers resulting in a pressure drop in said first regenerator not more than 1 psi.

30. The system according to claim 1, said orifice pulse tube refrigerator comprising a first stage orifice pulse tube refrigeration unit and a second stage orifice pulse tube refrigeration unit that operates at a lower temperature than the first stage refrigeration unit, each of the first and second stage refrigeration units comprising a respective regenerator, cold heat exchanger, pulse tube and hot heat exchanger, said second stage regenerator having a second heat absorptive material therein, said second heat absorptive material having a volumetric heat capacity of at least 0.23 J/cm$^3$K at 13-14K, a volumetric heat capacity of at least 0.5 J/cm$^3$K at 18-20K, and a porosity of 0.2-0.5.

31. The system according to claim 30, said second heat absorptive material being provided as a rare earth metal or rare earth metal compound.

32. The system according to claim 30, said second heat absorptive material being selected from the group consisting of erbium compounds.

33. The system according to claim 30, said second heat absorptive material being selected from the group consisting of erbium-praseodymium compounds.

34. The system according to claim 30, said second heat absorptive material being provided in the form of spheres having a mean diameter of 60-100 microns.

35. The system according to claim 1, said orifice pulse tube refrigerator comprising a first stage orifice pulse tube refrigeration unit and a second stage orifice pulse tube refrigeration unit, each of the first and second stage refrigeration units comprising a respective regenerator, cold heat exchanger, pulse tube, hot heat exchanger, primary orifice, inertance tube, and reservoir volume,
wherein the first and second stage regenerators, cold heat exchangers and pulse tubes extend or are disposed within said void space defined by said toroidal storage vessel and located at the geometric center thereof.

36. The system according to claim 35, further comprising an outer housing defining a primary vacuum chamber therein,
said storage vessel and the first and second stage regenerators, cold heat exchangers and pulse tubes all being disposed within said primary vacuum chamber of said outer housing,
and the first and second stage hot heat exchangers, primary orifices, inertance tubes and reservoir volumes being disposed outside of said primary vacuum chamber.

37. The system according to claim 1, said system being effective to maintain liquid hydrogen in said storage vessel at or below 20K at steady state, such that substantially no venting of vaporized hydrogen is necessary to relieve hydrogen overpressure within the vessel.

38. The system according to claim 1, further comprising an oscillatory gas pressure power source coupled to said orifice pulse tube refrigerator, said oscillatory gas pressure power source being adapted to provide periodic pressure surges in a working fluid to drive said orifice pulse tube refrigerator to thereby generate refrigeration power.

39. The system according to claim 38, said oscillatory gas pressure power source being an electric gas compressor.

40. The system according to claim 39, said electric gas compressor being electric flexure bearing linear drive compressor.

41. The system according to claim 1, said orifice pulse tube refrigerator comprising a first stage orifice pulse tube refrigeration unit and a second stage orifice pulse tube refrigeration unit, each of the first and second stage refrigeration units comprising a respective regenerator, cold heat exchanger, pulse tube and hot heat exchanger, wherein net refrigeration power for each of the first and second stage refrigeration units is generated respectively at the first stage cold heat exchanger and the second stage cold heat exchanger.

42. The system according to claim 41, said orifice pulse tube refrigerator being operable at steady state to generate 4-6 watts of refrigeration power with said first stage cold heat exchanger operating at 60-100K and said second stage cold heat exchanger operating at 13-20K.

43. An automobile comprising a hydrogen-powered internal combustion engine and/or a hydrogen-powered fuel cell, and a hydrogen storage and delivery system according to claim 1.

44. A hydrogen storage and delivery system comprising a toroidal liquid hydrogen storage vessel, an orifice pulse tube refrigerator, and a cooling system, said toroidal storage vessel having an interior surface defining a liquid hydrogen storage volume, said storage vessel further defining a void space located at the geometric center of the storage vessel, said orifice pulse tube refrigerator extending within said void space at the geometric center of the storage vessel and comprising a first stage pulse tube refrigeration unit and a second stage pulse tube refrigeration unit, each of the first and second stage refrigeration units comprising a respective regenerator, cold heat exchanger, pulse tube and hot heat exchanger, wherein net refrigeration power for each of the first and second stage refrigeration units is generated at the respective first and second stage cold heat exchangers, and wherein the second stage cold heat exchanger operates at a lower temperature than the first stage cold heat exchanger, said cooling system comprising a first thermal jacket in the shape of a toroid located concentrically adjacent and substantially enclosing the liquid hydrogen storage vessel, and a second thermal jacket in the shape of a toroid located concentrically adjacent and substantially enclosing the first thermal jacket.

45. The system according to claim 44, said first thermal jacket comprising a first length of tubing coiled in the shape of a toroid substantially enclosing the storage vessel and in fluid communication with a first refrigerant fluid flow passage thermally coupled to or located in the second stage cold heat exchanger, said second thermal jacket comprising a second length of tubing coiled in the shape of a toroid substantially enclosing the first thermal jacket and in fluid communication with a second refrigerant fluid flow passage thermally coupled to or located in the first stage cold heat exchanger.

46. The system according to claim 45, further comprising a super insulation material provided or wrapped around said storage vessel and said first thermal jacket, wherein said second thermal jacket is provided or embedded within, or in between adjacent layers of, said super insulation material.

47. The system according to claim 44, further comprising an outer housing defining a primary vacuum chamber therein, said storage vessel, cooling system, first and second stage regenerators, cold heat exchangers, pulse tubes and hot heat exchangers all being disposed within said primary vacuum chamber.

48. The system according to claim 47, said housing further defining a secondary chamber, separate and apart from said primary vacuum chamber, said system further comprising relatively high temperature hydrogen conditioning equipment located within said secondary chamber, said conditioning equipment being adapted at least to vaporize liquid hydrogen delivered thereto from said storage vessel, prior to delivering said hydrogen as a gas to a hydrogen-powered internal combustion engine or fuel cell.

49. The system according to claim 44, further comprising an electric flexure bearing linear drive compressor coupled to said orifice pulse tube refrigerator and adapted to provide periodic pressure surges in a working fluid to drive the orifice pulse tube refrigerator to thereby generate refrigeration power at said first and second stage cold heat exchangers.

50. The system according to claim 1, further comprising a liquid level sensing probe disposed within said storage vessel, said liquid level sensing probe comprising a plurality of adhered flexible dielectric strips and a series of temperature sensing units disposed at spaced intervals along the length of the probe, said probe remaining flexible at a temperature of 80K.

51. The system according to claim 44, further comprising a liquid level sensing probe disposed within said storage vessel, said liquid level sensing probe comprising a plurality of adhered flexible dielectric strips and a series of temperature sensing units disposed at spaced intervals along the length of the probe, said probe remaining flexible at a temperature of 80K.

52. The system according to claim 1, further comprising hydrogen conditioning equipment adapted to condition hydrogen drawn from said storage vessel to provide conditioned hydrogen in a suitable state for delivery to an engine or fuel cell that consumes said conditioned hydrogen as fuel.

53. The system according to claim 1, said storage vessel being adapted to deliver therefrom a metered quantity of hydrogen on demand for use as a fuel.

* * * * *